United States Patent
Yamaguchi

(10) Patent No.: US 6,992,689 B2
(45) Date of Patent: *Jan. 31, 2006

(54) LIGHT SCANNING UNIT FOR USE IN IMAGE FORMING APPARATUS

(75) Inventor: Masao Yamaguchi, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 11/012,223

(22) Filed: Dec. 16, 2004

(65) Prior Publication Data

US 2005/0110862 A1 May 26, 2005

Related U.S. Application Data

(63) Continuation of application No. 10/424,834, filed on Apr. 29, 2003, now Pat. No. 6,839,076.

(51) Int. Cl.
*G03G 21/14* (2006.01)
*G02B 26/12* (2006.01)

(52) U.S. Cl. ............... 347/235; 347/250; 347/243; 347/244; 347/258; 347/259

(58) Field of Classification Search ........... 347/235, 347/250, 241, 243, 244, 256, 258, 259, 260; 359/205, 206, 642
See application file for complete search history.

(56) References Cited

U.S. PATENT DOCUMENTS

| | | | |
|---|---|---|---|
| 6,288,819 B1 | 9/2001 | Aoki et al. | |
| 6,667,757 B2 | 12/2003 | Yamaguchi et al. | |
| 6,700,596 B2 | 3/2004 | Ishihara | |
| 6,839,076 B2 * | 1/2005 | Yamaguchi | 347/235 |
| 2003/0197778 A1 | 10/2003 | Miura | |
| 2004/0190099 A1 | 9/2004 | Yamaguchi | |

FOREIGN PATENT DOCUMENTS

| | | | |
|---|---|---|---|
| JP | 2000-028944 | * | 1/2000 |
| JP | 2000-028944 A | | 1/2000 |
| JP | 2002-328323 | * | 11/2002 |
| JP | 2002-328323 A | | 11/2002 |

OTHER PUBLICATIONS

U.S. Appl. No. 10/879,999, filed Jun. 30, 2004, Yamaguchi.

* cited by examiner

*Primary Examiner*—Huan Tran
(74) *Attorney, Agent, or Firm*—Foley & Lardner LLP

(57) ABSTRACT

A light scanning unit of the present invention can reduce the degree of variation in the quantity of light on a photosensitive body by a scanning position and can reduce a difference in density of an image which occurs at image formation.

21 Claims, 4 Drawing Sheets

LIGHT SCANNING UNIT FOR USE IN IMAGE FORMING APPARATUS

The present application is a continuation of U.S. application Ser. No. 10/424,834, filed Apr. 29, 2003, the entire contents of which are incorporated herein by reference.

BACKGROUND OF THE INVENTION

The present invention relates to a light scanning unit for use in, for example, a laser printer, a digital copier and the like and, particularly, to a light scanning unit of an over-illumination type in which a width in a main scanning direction of a luminous flux made incident on a polygon mirror (a direction along a rotary direction of the polygon mirror) is greater than a width in the main scanning direction, of reflective surfaces of the polygon mirror.

As the light scanning units of light scanning units of the over-illumination type invented by the present inventor, there are Jpn. Pat. Appln. KOKAI Publication No. 2002-328323 and U.S. Pat. No. 10/131,207 (filed Apr. 25, 2002) corresponding thereto.

The width in the main scanning direction of a light beam deflected by the polygon mirror is constant irrespective of a scanning angle (position angle) in a light scanning unit of under-illumination type though it is varied in accordance with a scanning angle in the above-mentioned light scanning unit of the over-illumination type.

In the present inventor's senior application, too, however, the problem that if the light beam made incident on the polygon mirror forms an angle with an optical axis of an image-forming optical system on a main scanning plane (if the light beam is made incident obliquely), irregularity beam diameter is laterally asymmetric about a center of the optical axis of the image-forming optical system, in the main scanning direction, is not solved completely.

When the beam diameter is irregular and laterally asymmetric about the center of the optical axis of the image-forming optical system, there is a problem that a latent image formed on a photosensitive body, i.e. an image density is varied at each scanning position.

Incidentally, if the light beam is made incident on an arbitrary reflective surface of the polygon mirror from a front face in the main scanning direction (in the vicinity) to reduce the irregularity in the beam diameter of the light beam on an image face (photosensitive body), the light beam traveling between a lens group, which is provided between the polygon mirror and the photosensitive body, and the arbitrary reflective surface of the polygon mirror forms an image within an image region of the photosensitive body and thereby causes degradation in image quality. The image quality is improved by the above proposal of the present inventor, but the degradation is not solved completely.

Even if a reflection prevention film is provided on the lens surface of the arbitrary lens to reduce the irregularity in the beam diameter of the light beam, the manufacturing costs of the lens are increased, profile irregularity of the lens surface is deteriorated and the optical characteristics are worsened as already disclosed by the present inventor.

BRIEF SUMMARY OF THE INVENTION

An object of the present invention is to provide a light scanning unit of an over-illumination type, capable of making density of an exposed image stable by restricting variation in a diameter of a light beam at all of scanning positions in a main scanning direction within a predetermined range.

According to an aspect of the present invention, the light scanning unit comprises a first optical system modifying a beam shape of a luminous flux emitted from a light source to a predetermined shape, a light deflecting unit having at least one reflective surface and deflecting the luminous flux whose beam shape is modified by the first optical system, in a predetermined first direction, a length of the deflected luminous flux in the first direction being greater than a length of the reflective surface along the first direction, a second optical system allowing the luminous flux deflected in the first direction by the light deflecting unit to form an image on an object to be scanned, and a sensor for detection of a write position, setting a timing to modulate an intensity of the luminous flux from the light source with image information. The sensor is positioned at an end of a side on which a beam diameter of the luminous flux is great, of a scanning end of the first direction on the object to be scanned.

According to another aspect of the present invention, the light scanning unit comprises an image-forming unit having a predetermined length in a first direction and a predetermined thickness in a direction orthogonal to the first direction, and forming an image of light made incident from directions orthogonal to the respective first and second directions, at a predetermined position of an object to be scanned, nearly linearly along the first direction, a light detector which detects the light whose image is formed nearly linearly along the first direction of the object to be scanned, by the image-forming unit, to set a timing to modulate an intensity of the light with image information, and which is positioned at any of one side end and the other side end of the first direction of the image-forming unit where a beam diameter of the light becomes great, a deflecting unit having at least one reflective surface that is elongated in the first direction, and continuously reflecting the light, along the first direction, toward a predetermined position of the image-forming unit, by varying the angle of the reflective surface, a length of the first direction of the light being greater than a length of the first direction of the reflective surface, and an optical unit modifying a beam shape of the light to be guided to the deflecting unit to a predetermined shape and guiding the light to the reflective surface of the deflecting unit.

According to yet another aspect of the present invention, the image forming apparatus comprises an image carrier capable of retaining an image corresponding to light distribution, wherein when light is applied to the image carrier in a state of being provided with a predetermined potential the potential is varied, an exposing unit, and a developing unit visualizing the image retained by the image carrier. The exposing unit comprises an image-forming unit having a predetermined length in a first direction and a predetermined thickness in a direction orthogonal to the first direction, and forming an image of light made incident in directions orthogonal to the respective first and second directions, at a predetermined position of an object to be scanned, nearly linearly along the first direction, a light detector which detects the light whose image is formed nearly linearly along the first direction of the object to be scanned, by the image-forming unit, to set a timing to modulate an intensity of the light with image information, and which is positioned at any of one side end and the other side end of the first direction of the image-forming unit where a beam diameter in the first direction of the light becomes great, a deflecting unit comprising at least one reflective surface that is elongated in the first direction, and continuously reflecting the light, along the first direction, toward a predetermined position of the image-forming unit, by varying the angle of the reflective surface, a length of the first direction of the light being greater than a length of the first direction of the reflective surface, and an optical unit modifying a beam shape of the light to be guided to the deflecting unit to a predetermined shape and guiding the light to the reflective surface of the deflecting unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
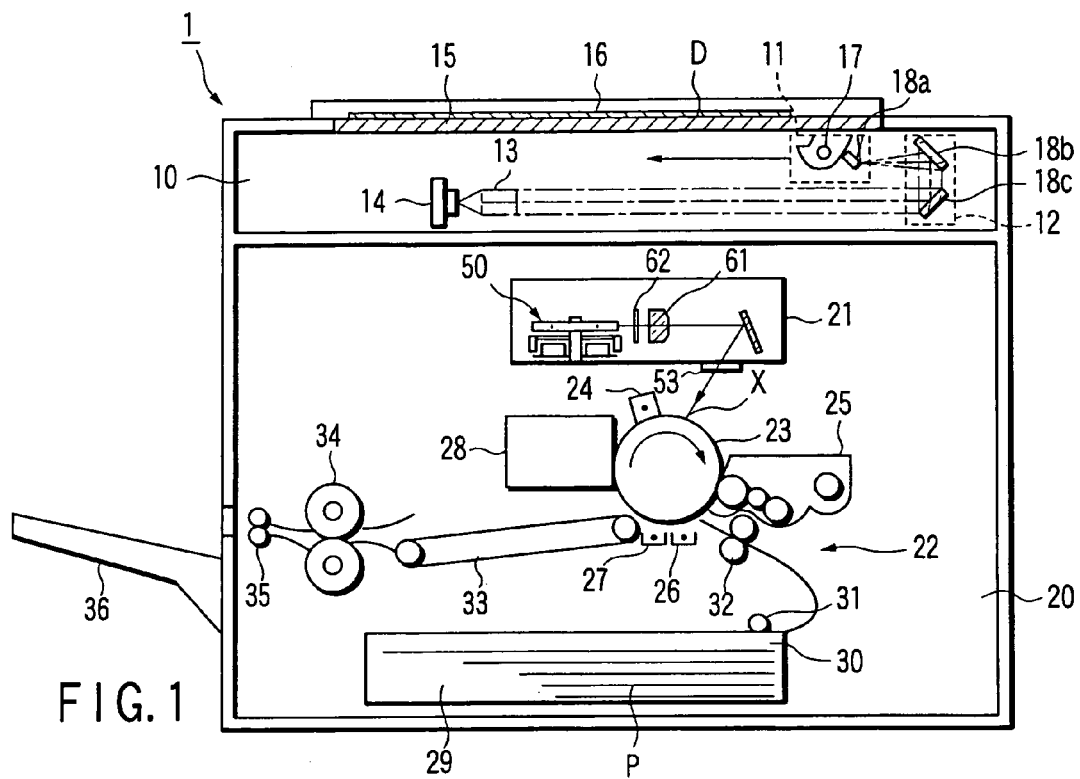
FIG. 1 is a schematic view showing an example of an image forming apparatus into which the light scanning unit according to an embodiment of the present invention is incorporated.

An embodiment of the present invention will be described in detail with reference to the drawings. FIG. 1 shows a digital copier which is an image forming apparatus comprising a light scanning unit according to this embodiment.

As shown in FIG. 1, a digital copier 1 comprises a scanner unit 10 serving as, for example, image reading means and a printer unit 20 serving as image forming means.

The scanner unit 10 includes a first carriage 11 formed to be movable in a direction of an arrow, a second carriage 12 driven to move by the movement of the first carriage 11, an optical lens 13 which provides light from the second carriage 12 with predetermined image-forming characteristics, a photoelectric conversion element 14 which performs photoelectric conversion of the light to which the predetermined image-forming characteristics are provided by the optical lens 13 and outputs an electric signal, a document table 15 which retains a document D, a document fixing cover 16 which pushes the document D against the document table 15, and the like.

A light source 17 which illuminates the document D and a mirror 18a which reflects the light applied from the light source 17 and reflected on the document D to the second carriage 12, are provided at the first carriage 11.

A mirror 18b which reflects the light from the mirror 18a of the first carriage 11 at 90 degrees and a mirror 18c which further reflects the light reflected by the mirror 18b at 90 degrees, are provided at the second carriage 12.

The document D placed on the document table 15 is illuminated by the light source 17 to reflect light in which brightness and darkness of light corresponding to the presence and absence of an image are distributed. The reflected light of the document D is made incident on the optical lens 13 via the mirrors 18a, 18b and 18c as image information of the document D. The reflected light guided from the document D to the optical lens 13 is condensed on a light receiving surface of the photoelectric conversion element (CCD sensor) 14 by the optical lens 13.

When start of image formation is input from an operation panel or external device (not shown), the first carriage 11 and the second carriage 12 are temporarily moved to home positions which are determined to have a predetermined positional relationship with the document table 15, by drive of a carriage driving motor (not shown). Then the first carriage 11 and the second carriage 12 are moved along the document table 15 at a predetermined speed. Thus, the image information of the document D, i.e. the image light reflected from the document D, is cut out in a predetermined width along a direction in which the mirror 18a extends, i.e. the main scanning direction, and is reflected to the mirror 18b. Then the image light is sequentially cut out by unit of the width which is cut out by the mirror 18a, in a direction perpendicular to the direction in which the mirror 18a extends, i.e. a sub-scanning direction. Therefore all of image information items of the document D are guided to the CCD sensor 14 by moving the first carriage 11 along the longitudinal direction of the document D. An electric signal which is output from the CCD sensor 14 is an analog signal, which is converted into a digital signal by an A/D converter (not shown). The digital signal is temporarily stored in an image memory (not shown) as an image signal.

In the above manner, the image of the document D placed on the document table 15 is converted into, for example, a 8-bit digital image signal which represents light and shade of the image in an image processing unit (not shown) by each line along a first line in which the mirror 18a extends, by the CCD sensor 14.

The printer unit 20 comprises a light scanning unit 21 which serves as an exposure unit to be explained later by referring to FIGS. 2A, 2B and 3, and an electrophotographic image-forming unit 22 capable of forming an image on recording paper P which is an image-formed medium.

A drum (cylinder)-like photosensitive body (hereinafter 'photosensitive drum') 23 which is rotated by a main motor to be explained by referring to FIG. 3 such that an optional position is moved at a predetermined speed, and on which an electrostatic latent image corresponding to the image data, i.e. the image of the document D is formed by irradiation of a laser beam L from the light scanning unit 21, is provided at a predetermined position of the image-forming unit 22.

The photosensitive body does not need to be shaped in a cylinder, but may be shaped in, for example, a belt.

A charging unit 24 which applies a surface potential of predetermined polarity to the surface of the photosensitive drum 23, a developing unit 25 which selectively supplies toner as a visualizing agent to the electrostatic latent image formed on the photosensitive drum 23 by the light scanning unit and develops the image, a transfer unit 26 which applies a predetermined electric field to the toner image formed on an outer periphery of the photosensitive drum 23 by the developing unit 25 and transfers the toner image onto the recording paper P, a separating unit 27 which releases the recording paper P on which the toner image is transferred by the transferring unit and the toner between the recording paper P and the photosensitive drum 23 from electrostatic adsorption with the photosensitive drum 23 and separates them (from the photosensitive drum 23), a cleaning unit 28 which removes remaining toner left on the outer peripheral surface of the photosensitive drum 23 and returns the potential distribution of the photosensitive drum 23 to a state before the surface potential is supplied by the charging unit 24, and the like are positioned around the photosensitive drum 23. The charging unit 24, the developing unit 25, the transfer unit 26, the separating unit 27 and the cleaning unit 28 are arranged in order, along a direction of an arrow in which the photosensitive drum 23 is rotated. The laser beam L from the light scanning unit 21 is applied onto a predetermined position X on the photosensitive drum 23 between the charging unit 24 and the developing unit 25.

The image signal which is read from the document D by the scanner unit 10 is subjected to, for example, processing such as gray scale processing for halftone display or outline correction, and is converted into a printing signal, by an image processing unit (not shown). The printing signal is further converted into a laser modulation signal. The laser modulation signal causes the intensity of light of the laser beam applied from a semiconductor laser device which is provided at the light scanning unit 21 and which will be explained below to be varied to either intensity which allows an electrostatic latent image to be recorded on the outer periphery of the photosensitive drum 23 to which the predetermined surface potential is supplied by the charging unit 24 or intensity which allows no electrostatic latent images to be recorded thereon.

Each semiconductor laser device of the light scanning unit 21 to be explained below is intensity-modulated in accordance with the above-mentioned laser modulation signal, and emits light so as to record the electrostatic latent image at a predetermined position on the photosensitive drum 23 in response to predetermined image data. The light from the semiconductor laser device is deflected in a first direction that is the same as a reading line of the scanner unit 10 by a deflecting unit in the light scanning unit 21 which will be explained below, and is applied to a predetermined position X on the outer periphery of the photosensitive drum 23.

Similarly, when the first carriage 11 and the second carriage 12 of the scanner unit 10 are moved along the document table 15 by rotating the photosensitive drum 23 in the direction of the arrow at a predetermined speed, the laser beam from the semiconductor laser device which is continuously deflected by the deflecting unit is focused in each line, at a predetermined interval, on the outer periphery of the photosensitive drum 23.

Thus, the electrostatic latent image corresponding to the image signal is formed on the outer periphery of the photosensitive drum 23.

The electrostatic latent image formed on the outer periphery of the photosensitive drum 23 is developed by toner from the developing unit 25 and moved to a position opposite to the transfer unit 26 by the rotation of the photosensitive drum 23. A sheet of paper is taken out of a paper cassette 29 by a feed roller 30 and a separation roller 31. The image is transferred onto recording paper P whose timing of feeding is adjusted by aligning rollers 32, by an electric field from the transfer unit 26.

The recording paper P onto which the toner image is transferred is separated therefrom together with the toner by the separating unit 27 and guided to a fixing unit 34 by a feeding unit 33.

The recording paper P fed to the fixing unit 34 is ejected onto a tray 36 by ejection rollers 35 after the toner (toner image) is fixed by heat and pressure from the fixing unit 34.

On the other hand, after the toner image (toner) is transferred onto the recording paper P by the transfer unit 26, the photosensitive drum 23 is opposed to the cleaning unit 28 such that transfer residual toner (remaining toner) which is left on the outer periphery is removed, and is made to return to an initial state, i.e. a state before the surface potential is supplied by the charging unit 24 such that next image formation can be performed, as a result of continuous rotation.

Successive image formation can be performed by repeating the above process.

Thus, image information is read from the document D set on the document table 15 by the scanner unit 10, the read image information is converted into the toner image, which is output onto the recording paper P, by the printer unit 20, and copying is thereby performed.

In the above explanation of the image forming apparatus, a digital copier has been taken as an example. For example, however, a printer apparatus in which an image reading unit is not provided may also be taken.

Figure 2A:
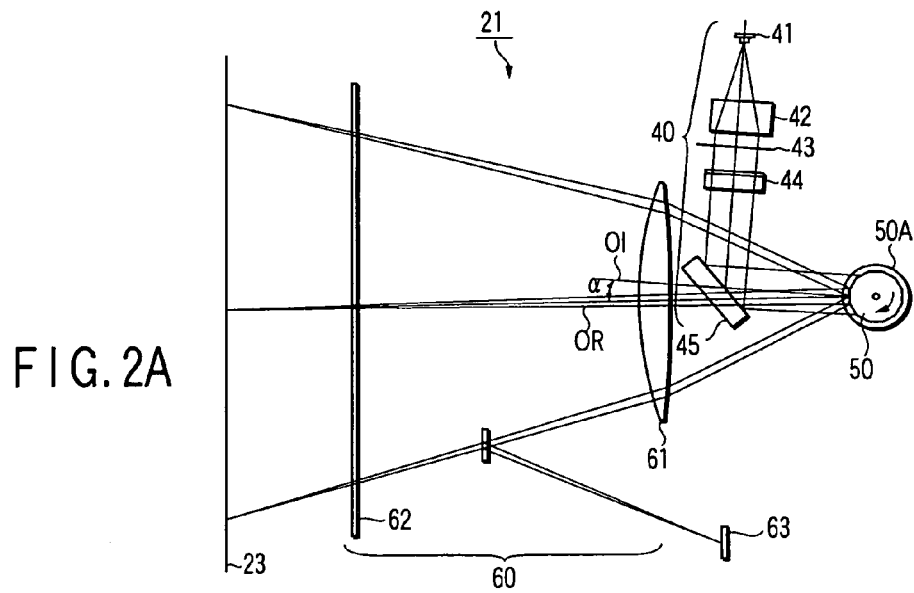
FIGS. 2A and 2B are schematic views an example of the light scanning unit incorporated into the image forming apparatus shown in FIG. 1.
Figure 2B:
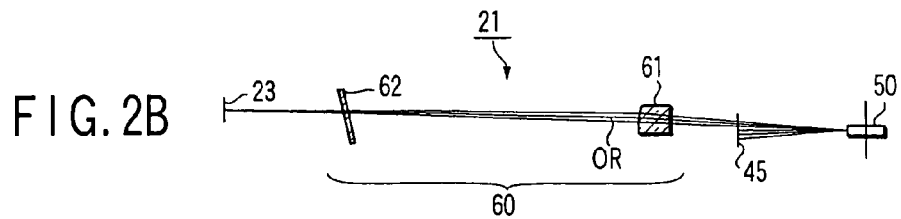

FIGS. 2A and 2B are schematic views of the structure of the light scanning unit shown in FIG. 1.

FIG. 2A is a schematic plan view showing optical elements arranged between the light source (semiconductor laser device) included in the light scanning unit and the photosensitive drum (object to be scanned) as seen in a direction orthogonal to a main scanning direction (first direction) parallel to a direction in which the light beam passing from the light deflector (polygon mirror) to the photosensitive drum is scanned by the light deflector, and also showing the reflection made by the mirror. FIG. 2B is a schematically view showing a plane seen in a sub-scanning direction (second direction) that is orthogonal to the direction shown in FIG. 2A, i.e. the main scanning direction.

As shown in FIGS. 2A and 2B, the light scanning unit 21 includes a light source 41 which emits light of a predetermined wavelength, a light deflector 50 which deflects the light from the light source in a predetermined direction, a pre-deflection optical system 40 which guides the light from the light source to the light deflector 50, and an image-forming optical system 60 which makes the light beam deflected by the light deflector 50 form an image on the photosensitive drum 23 under predetermined conditions.

The pre-deflection optical system 40 has at least one of a finite focal lens 42 which deforms a beam shape of a light beam L emitted from the light source 41 to a predetermined shape and size a collimator lens 42, a lens 42 converts the light beam into divergent light, an aperture 43 which limits the quantity of light (luminous flux diameter) of the laser beam L passing through the finite focal-point lens or collimating lens or the lens 42 which converts the light beam into divergent light, to a predetermined magnitude, a cylindrical lens 44 which is provided with positive power in an only sub-scanning direction to deform the beam shape of the laser beam L whose quantity of light is limited by the aperture 43 to a predetermined beam shape, a mirror 45 which deflects the laser beam L having the beam shape deformed by the cylindrical lens 44 in a predetermined direction, and the like. The light source 41 is, for example, a semiconductor laser device which emits the laser beam (light beam) L of 780 nm.

The laser beam L which is provided with a predetermined beam shape by the pre-deflection optical system 40 is deflected (continuously reflected) to the photosensitive drum (scanned surface) 23 positioned at a subsequent stage, i.e. scanned nearly linearly along a predetermined direction, by the polygon mirror (light deflector) 50 in which at least one reflective surface and a polygon mirror motor 50A capable of rotating the reflective surface at a predetermined speed are formed integrally.

The image-forming optical system 60 which forms an image of the laser beam L reflected continuously on each of the reflective surfaces of the polygon mirror 50, nearly linearly along an axial direction of the photosensitive drum 23, is provided between the polygon mirror 50 and the photosensitive drum 23.

The image-forming optical system 60 comprises an image forming lens (generally called a fθ lens) 61 capable of providing convergence which is provided with a predetermined relationship on the basis of an angle at which the polygon mirror 50 is rotated, and a dust-proof glass 62 which prevents the toner, dust, paper dust and the like suspended in the image-forming unit 22 from intruding a housing (not shown) of the light scanning unit 21, and the like. A horizontal synchronization sensor (sensor for detection of write position) 63 which monitors a timing of emitting the laser beam whose intensity is varied by the image signal from the light source 41 (timing of modulating the intensity of the light emitted from the light source 41 by image information), i.e. which monitors synchronization of the laser beam L in the main scanning direction, is provided at a predetermined position which will be explained below with reference to FIG. 4, of the laser beam L passed through the image focusing lens 61.

A position on the photosensitive drum 23 as represented by exposure position X in FIG. 1, of the laser beam L reflected continuously on each of the reflective surfaces of the polygon mirror 50 when it is applied onto the photosensitive drum 23, is made proportional to a rotation angle of each of the reflective surfaces of the polygon mirror 50, the laser beam L is deformed to have a predetermined beam diameter, between an end of a longitudinal (axial) direction of the photosensitive drum 23 and the other end thereof, at any position on the photosensitive drum 23 in the longitudinal direction, and the laser beam L is made to form an image on the photosensitive drum 23, by image-forming optical system 60. At this time, the timing at which the laser beam L is modulated on the basis of the image information (timing of starting exposure in the main scanning direction) is set on the basis of the laser beam L in the main scanning direction monitored by the above-explained horizontal synchronization sensor 63.

An optical path of the laser beam L from the semiconductor laser device 41 in the optical scanning unit 21 to the photosensitive drum 23 is deflected inside the housing (not shown) of the optical scanning unit 21, by a plurality of mirrors or the like (not shown). The image forming lens 61 and any one of the mirrors (not shown) may be formed integrally by optimizing curvatures of the main scanning direction and the sub-scanning direction of the image forming lens 61 and the optical path between the polygon mirror 50 and the photosensitive drum 23.

In the optical scanning unit shown in FIGS. 2A and 2B, when each of an axis $O_I$ along a main light ray of the incident laser beam directed to each of the reflective surfaces of the polygon mirror 50 and an optical axis $O_R$ of the image-forming optical system 60 is projected to a main scanning plane, an angle α made by both of them is α=5°. In addition, an angle made by the incident laser beam and the optical axis $O_R$ of the image-forming optical system is 2° as the optical scanning unit is seen from a sub-scanning cross-section.

Figure 3:
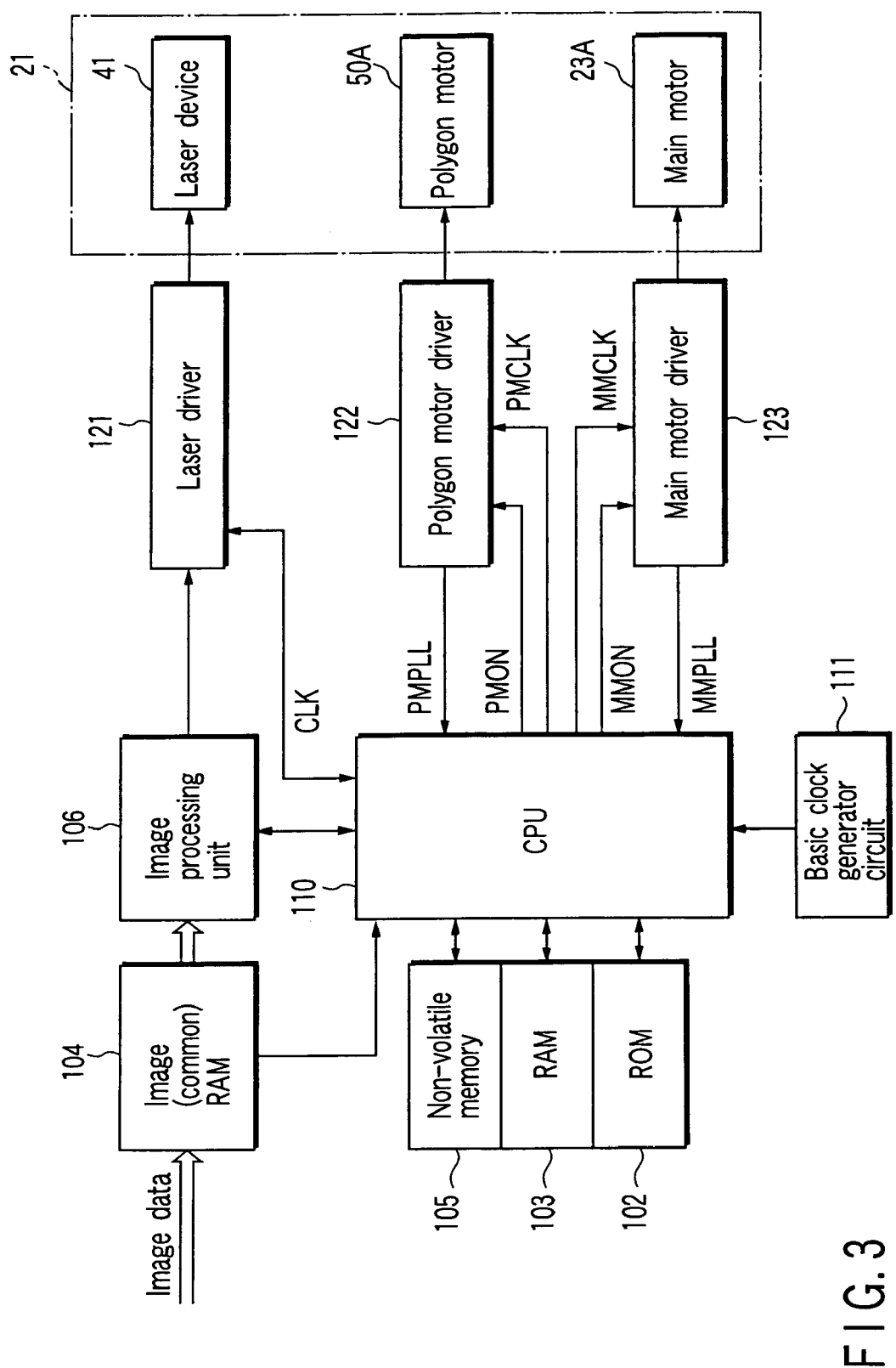
FIG. 3 is a schematic block diagram showing an example of a drive circuit of a digital copier comprising the light scanning unit shown in FIGS. 2A and 2B.

FIG. 3 is a schematic block diagram showing an example of a drive circuit of a digital copier comprising the light scanning unit shown in FIGS. 2A and 2B.

A ROM (read only memory) 102 which stores predetermined operation rules and initial data, a RAM 103 which temporarily stores input control data, a common (image) RAM 104 which maintains image data from the CCD sensor 14 or image data supplied from an external device and which outputs the image data to an image processing circuit to be explained below, an NVM (non-volatile memory) 105 which maintains stored data even if passage of electric current to the copier 1 is shut down with a battery backup, an image processing unit 106 which subjects the image data stored in the image RAM 104 to predetermined image processing and outputs the image data to a laser driver to be explained below, and the like, are connected to a CPU 101 serving as a main controller.

In addition, a laser driver 121 which allows the semiconductor laser device 41 of the light scanning unit 21 to emit light, a polygon motor driver 122 which drives the polygon motor 50A rotating the polygon mirror 50, a main motor driver 123 which drives the main motor 23A driving the photosensitive drum 23, the feeding mechanisms of the accompanying paper (transferred material), and the like, are also connected to the CPU 101. A repetition period of the laser beam L in the main scanning direction monitored by the horizontal synchronization sensor 63 explained with reference to FIG. 2A is input to the laser driver 121 via the CPU 101 (under control of the CPU 101).

In the light scanning unit 21 shown in FIGS. 2A and 2B, the beam shape of the divergent laser beam L emitted from the semiconductor laser device 41 is converted convergently or substantially parallel (or divergently in a rare case), by the finite focal-point lens or collimating lens or the lens 42 which performs conversion into divergent light.

The laser beam L whose beam shape is converted into a predetermined shape is passed through the aperture 43 such that the luminous flux width (luminous flux diameter) and the quantity of light are set to be optimum, and is provided with predetermined convergence in the only sub-scanning direction by the cylindrical lens 44. Thus, the laser beam L is shaped in a line extended in the main scanning direction on each of the reflective surfaces of the polygon mirror 50.

The polygon mirror 50 is, for example, a dodecahedron and an inscribed circle thereof is formed to have a diameter Dp of 29 mm. A width Wp in the main scanning direction, of each of the reflective surfaces (twelve surfaces) of the polygon mirror 50, can be obtained from:

$$Wp = \tan(\pi/N) \times Dp$$

where N represents the number of the reflective surfaces of the polygon mirror 50. In this example, Wp is:

$$Wp = \tan(\pi/12) \times 29 = 7.77 \text{ mm.}$$

On the other hand, a beam width $D_L$ in the main scanning direction, of the laser beam L applied to each of the reflective surfaces of the polygon mirror 50 is approximately 32 mm, i.e. set widely as compared with the width Wp=7.77 mm in the main scanning direction, of each of the reflective surfaces of the polygon mirror 50.

The laser beam L guided to each of the reflective surfaces of the polygon mirror 50, reflected continuously and then scanned (deflected) linearly by the rotation of the polygon mirror 50, is provided with predetermined image-forming characteristics by the image forming lens 61 of the image-forming optical system 60 such that the beam diameter becomes nearly uniform, at least, in the main scanning direction, on the photosensitive drum 23 (image surface). The laser beam L is made to form an image, nearly linearly, on the surface of the photosensitive drum 23.

The rotation angle of each of the reflective surfaces of the polygon mirror 50, and the image-forming position, i.e. scanning position of the light beam made to form an image on the photosensitive drum 23, are corrected to have a proportional relationship by the image forming lens 61. Therefore, the speed of the light beam scanned linearly on the photosensitive drum 23 is constant in all the scanning regions, by the image forming lens 61. The image forming lens 61 is provided with a curvature which can also correct displacement of the scanning position in the sub-scanning direction caused by the influence of the fact that each of the reflective surfaces of the polygon mirror 50 is individually non-parallel to the sub-scanning direction, i.e. slant occurs on each of the reflective surfaces. Furthermore, the image forming lens 61 also corrects a curvature of an image surface. To correct these optical characteristics, the curvature is varied by the scanning position.

The shape of the lens surface of the image forming lens 61 is defined by TABLE 1 described below and the following formula:

$$x = \frac{CUY*y^2 + CUZ*z^2}{1+\sqrt{1-AY*CUY^2*y^2 - AZ*CUZ^2*z^2}} + \sum_{n=0}\sum_{m=0} A_{mn} y^m z^{2n} \quad (1)$$

where y represents the main scanning direction, z represents the sub-scanning direction and x represents the direction of the optical axis.

TABLE 1

| | | Incident surface | | |
|---|---|---|---|---|
| | CUY | CYZ | AY | AZ |
| | −5.672E−03 | −4.660E−03 | 1 | 1 |

| | | | m | | | |
|---|---|---|---|---|---|---|
| | | 0 | 1 | 2 | 3 | 4 | 5 |
| n | 0 | 0.000E+00 | 2.787E−03 | 1.980E−03 | 1.335E−07 | 1.044E−07 | −2.786E−11 |
| | 1 | 4.553E−03 | 1.328E−06 | −2.476E−07 | 5.778E−10 | 9.129E−11 | −1.236E−14 |
| | 2 | 5.619E−06 | −7.489E−09 | −8.817E−10 | 1.685E−12 | −6.660E−14 | −5.188E−16 |

| | | | m | | | |
|---|---|---|---|---|---|---|
| | | 6 | 7 | 8 | 9 | 10 |
| n | 0 | −7.059E−12 | 3.692E−15 | 1.841E−16 | −6.741E−20 | −1.779E−20 |
| | 1 | −7.811E−15 | −2.800E−18 | 3.600E−19 | 6.332E−22 | 8.659E−24 |
| | 2 | 9.075E−18 | 1.148E−19 | 5.498E−21 | −5.670E−24 | −3.951E−25 |

| | | Emitting surface | | |
|---|---|---|---|---|
| | CUY | CYZ | AY | AZ |
| | 5.092E−03 | 1.651E−02 | 1 | 1 |

| | | | m | | | |
|---|---|---|---|---|---|---|
| | | 0 | 1 | 2 | 3 | 4 | 5 |
| n | 0 | 0.000E+00 | −1.071E−03 | −8.388E−04 | 1.647E−07 | 5.067E−08 | −2.561E−11 |
| | 1 | 3.809E−03 | 9.143E−07 | −3.924E−07 | 5.036E−10 | 4.401E−11 | −2.248E−14 |
| | 2 | 2.945E−06 | −4.016E−09 | −1.720E−10 | 2.644E−13 | −3.675E−14 | −4.145E−17 |

| | | | m | | | |
|---|---|---|---|---|---|---|
| | | 6 | 7 | 8 | 9 | 10 |
| n | 0 | −4.086E−12 | 1.397E−15 | 1.539E−16 | 1.951E−19 | −4.158E−20 |
| | 1 | −5.812E−16 | 4.130E−18 | −1.228E−19 | 2.809E−22 | 9.314E−24 |
| | 2 | −1.222E−17 | 1.238E−20 | 3.609E−21 | 1.408E−24 | 7.214E−26 |

The material of the image forming lens 61 is acryl (PMMA), and a refractive index n thereof is n=1.483987 for a laser beam whose wavelength is 780 nm. The thickness of the image forming lens 61 is 24 mm in the defocusing direction of the optical axis (direction in which the laser beam passes), and the height of the image forming lens 61 in the sub-scanning direction is 25 mm.

As a rotation angle θ of each of the reflective surfaces of the polygon mirror 50 is made nearly proportional to the position of the laser beam L whose image is made on the photosensitive drum 23 by using such an image forming lens 61, the position of the laser beam L at which the image is formed on the photosensitive drum 23 can be corrected.

The image forming lens 61 can also correct displacement in the sub-scanning direction caused by deviation of the inclination in the sub-scanning direction of each of the reflective surfaces of the polygon mirror 50, i.e. irregularity in the amount of surface slant.

To be more precise, even if the inclination defined between the arbitrary reflective surface of the polygon mirror 50 and the rotation axis thereof is varied (in each of the reflective surfaces), the displacement of the scanning position in the sub-scanning direction, of the laser beam L guided onto the photosensitive drum 23 can be corrected by nearly making a relationship of optical conjugate between the laser beam incident surface (polygon mirror 50 side) of the image forming lens 61 and the emission surface (photosensitive drum 23 side) thereof.

The beam diameter of the laser beam L depends on the wavelength of the light beam L emitted from the semiconductor laser device 41. Thus, the beam diameter of the laser beam L can be made smaller by setting the wavelength of the laser beam L to be 650 nm or 630 nm or shorter.

Figure 4:
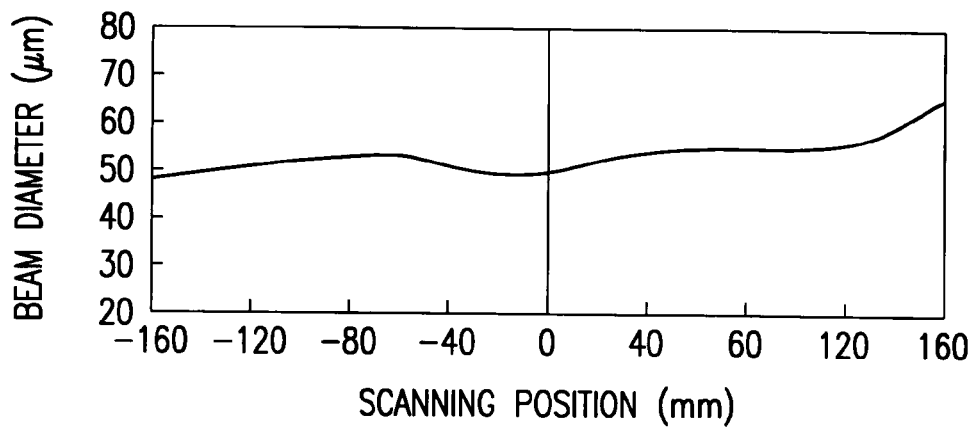
FIG. 4 is a graph for explanation of a relationship between a beam diameter in the first direction of a light beam scanned by the light scanning unit shown in FIGS. 2A and 2B and a scanning position of the light beam.

FIG. 4 shows the variation in the beam diameter in the first direction of the laser beam whose image is formed on the photosensitive drum by the light scanning unit described with reference to FIGS. 2A and 2B, in relation to the scanning position on the photosensitive drum ranging from −160 mm to 160 mm.

As shown in FIG. 4, it is confirmed that the beam diameter increases when the scanning position is on the scanning end of '+' side. This occurs as the '+' side of the scanning position is the scanning end opposite to the side where the laser beam L is made incident on the polygon mirror 50 and an F number is large. For example, if the image region of 300 mm is set to range from −160 mm to 140 mm (where the central value is −10 mm), the irregularity in the beam diameter is 8 μm. On the other hand, if the same image region is set to range from −140 mm to 160 mm (where the central value is +10 mm), the irregularity in the beam diameter reaches about 15 μm.

If the number of lenses is small, particularly, the ability to correct the irregularity in the beam diameter becomes small and, thus, the irregularity in the beam diameter at the scanning end can easily be greater. Furthermore, in the case of a plastic lens, the refractive index is small and the power is small. Thus, the ability to correct the beam diameter is small and the irregularity in the beam diameter at the scanning end can easily be greater.

Therefore, the irregularity in the beam diameter in the image region can be reduced by arranging the horizontal synchronization sensor (sensor for detection of write position) 63 shown in FIG. 2A at the position where the F number becomes large, i.e. the scanning position which is on the '+' side from the center (an end portion of the side (upstream side) where the beam diameter of the laser beam becomes great, of the scanning end in the first direction on the object to be scanned, i.e. the photosensitive drum 23) (the influence from the variation in the beam diameter on the image can be restricted by assigning the region of the scanning position where the beam diameter in the first direction is irregular to the horizontal synchronization sensor). As the laser beam L whose beam diameter is great is made incident on the horizontal synchronization sensor 63, inconvenience of being unable to sense the horizontal synchronization is solved.

In other words, where an angle obtained by projecting both the main light beam of the light incident on each of the reflective surfaces of the polygon mirror 50 and the optical axis of the image forming lens 61 onto the scanning plane is represented by α, the horizontal synchronization sensor 63 is positioned at a position where 'α≠0' is satisfied. The predetermined convergence that is provided to the laser beam L by the image forming lens 61 is maintained as it is and they are made incident on the horizontal synchronization sensor 63. That is, especial characteristics of image formation are not further provided to the laser beam directed from the image forming lens 61 to the photosensitive drum 23 by a image forming (convergence/divergence) system such as a lens or the like, and the laser beam is guided to the horizontal synchronization sensor 63.

That is, a problem arises that the irregularity in the beam diameter in the main scanning direction of the laser beam L whose image is formed on the photosensitive drum 23 becomes great in accordance with the scanning position in the main scanning direction, by using the image forming lens 61 whose angle is shifted from the optical axis in the direction of the main scanning plane or the sub-scanning cross-section, when the laser beam L scanned by each of the reflective surfaces of the polygon mirror 50 is made to form an image on the photosensitive drum 23. However, the influence of the irregularity in the beam diameter on the image can be restricted by arranging the horizontal synchronization sensor 63 at the scanning end of the side where the beam diameter is increased.

Figure 5A:
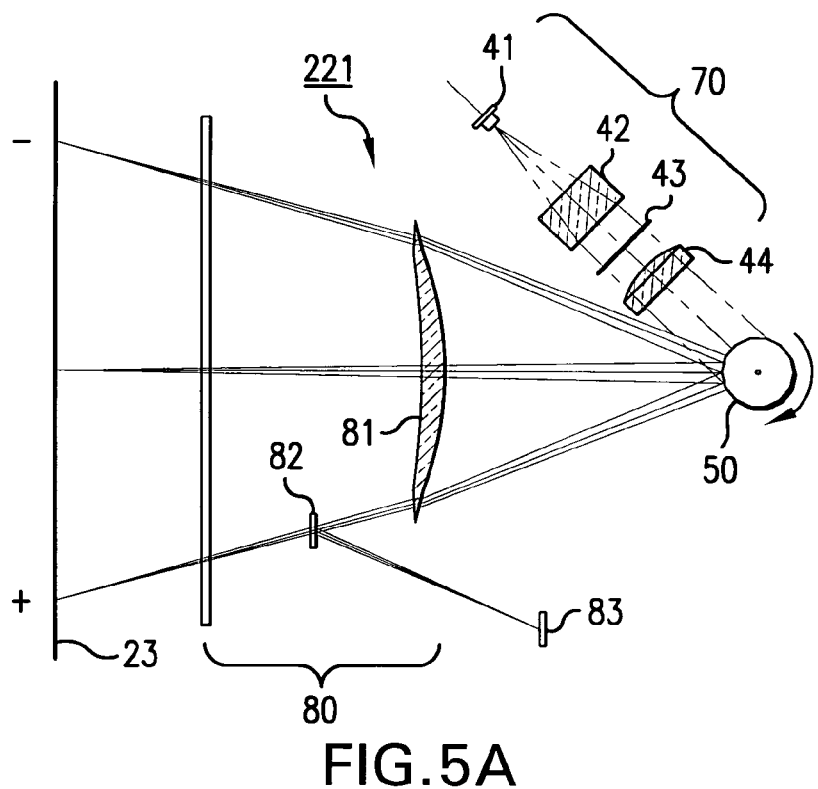
FIGS. 5A and 5B are schematic views showing an example of a light scanning unit which is different from the light scanning unit shown in FIGS. 2A and 2B.
Figure 5B:
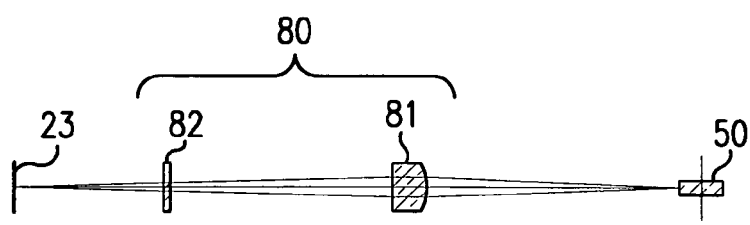

FIGS. 5A and 5B are schematic views for explanation of another embodiment of the light scanning unit shown in FIGS. 2A and 2B. The same structures as those already explained with reference to FIGS. 2A and 2B will be denoted by the same reference numerals and their detailed explanations will be omitted.

A light scanning unit 221 shown in FIGS. 5A and 5B is composed of a pre-deflection optical system 70 comprising the semiconductor laser device 41, the finite focal-point lens or collimating lens or the lens 42 which performs conversion into divergent light, the aperture 43, the cylindrical lens 44, etc., the polygon mirror 50 whose inscribed circle has a diameter of 25 mm and which is a dodecahedron, an image-forming optical system 80 comprising an image forming lens 81, a dust-proof glass 82 and a horizontal synchronization sensor 83, etc., and the like. The horizontal synchronization sensor 63 is provided on the '+' side (upstream side) that includes the scanning position where the irregularity in the beam diameter is great is at the center, in the main scanning direction, in the same manner as explained with reference to FIG. 2A.

In the light scanning unit 221 shown in FIGS. 5A and 5B, the laser beam from the semiconductor laser device 41 is made incident on each of the reflective surfaces of the polygon mirror 50, from the outside of the scanning region which makes a predetermined angle in the main scanning surface to the optical axis $O_R$ of the system of the image-forming optical system 80. The angle α between the optical axis $O_I$ of the incident side in which the laser beam directed to the polygon mirror 50 should pass and the optical axis $O_R$ of the image-forming optical system 80 is, for example, 46.42°. An angle between an incident laser beam Lo and the scanning plane (including the optical axis $O_R$) is 0° when both of the optical axes are seen from the sub-scanning cross-section.

The image forming lens 81 is formed of acryl, having a refractive index n=1.483987 and a thickness in the defocusing direction in the optical axis of 15 mm. A shape of the lens surface is defined by applying data of TABLE 2 shown below to the above-explained formula (2).

gence in the sub-scanning direction by a second mirror 192, and made to form an image, nearly linearly, at a predetermined position of the photosensitive drum 23. A horizontal synchronization sensor 193 is provided on the '+' side (upstream side) centering on the scanning position at which the irregularity in the beam diameter is great, in the main scanning direction, similarly to the cases explained with reference to FIGS. 2A and 5A. The irregularity in the beam diameter in the image region can be reduced by arranging the horizontal synchronization sensor (sensor for detection of write position) 193 shown in FIG. 7A at the position

TABLE 2

| | | Incident surface | | |
|---|---|---|---|---|
| | CUY | CYZ | AY | AZ |
| | −0.0047 | −0.0039 | 1 | 1 |

| | | m | | | | | | | |
|---|---|---|---|---|---|---|---|---|---|
| | | 0 | 1 | 2 | 3 | 4 | 5 | 6 | 7 | 8 |
| n | 0 | 0.00E+00 | −4.41E−03 | −2.71E−04 | 4.32E−07 | 1.17E−07 | −2.72E−11 | −1.52E−12 | 8.03E−16 | −2.34E−18 |
| | 1 | 1.75E−02 | 1.62E−06 | −2.71E−06 | 3.57E−10 | 9.86E−11 | 1.56E−14 | 1.02E−15 | −1.55E−18 | 4.56E−20 |

| | | Emitting surface | | |
|---|---|---|---|---|
| | CUY | CYZ | AY | AZ |
| | 0.0059 | −0.0036 | 1 | 1 |

| | | m | | | | | | | |
|---|---|---|---|---|---|---|---|---|---|
| | | 0 | 1 | 2 | 3 | 4 | 5 | 6 | 7 | 8 |
| n | 0 | 0.00E+00 | 5.70E−03 | −4.30E−03 | 4.60E−07 | 7.22E−08 | −1.58E−11 | −7.62E−13 | 5.08E−16 | −4.76E−17 |
| | 1 | 2.44E−02 | 3.38E−06 | −1.69E−06 | −3.36E−12 | −7.89E−12 | 8.52E−15 | 1.07E−15 | 1.55E−18 | 2.88E−19 |

Figure 6:
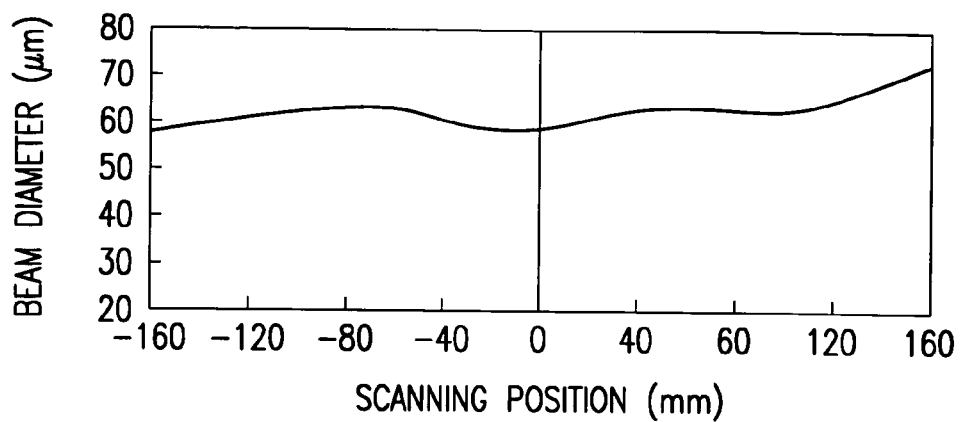
FIG. 6 is a graph for explanation of a relationship between a beam diameter in the first direction of a light beam scanned by the light scanning unit shown in FIGS. 5A and 5B and a scanning position of the light beam.

FIG. 6 shows a variation in the beam diameter of the scanning region (main scanning position) of the image surface in the light scanning unit shown in FIGS. 5A and 5B.

As shown in FIG. 6, it is confirmed that the beam diameter increases on the scanning end where the scanning position is on the '+' side. This occurs because the '+' side of the scanning position is opposite to the side on which the laser beam L is made incident on the polygon mirror 50 and the F number is large.

That is, the irregularity in the beam diameter in the image region can be reduced by arranging the horizontal synchronization sensor 83 shown in FIG. 5A at the position where the F number becomes large, i.e. the scanning position which is on the '+' side (upstream side) from the center, similarly to the case explained with reference to FIG. 2A (the influence from the variation in the beam diameter on the image can be restricted by assigning the region of the scanning position where the beam diameter in the first direction is irregular to the horizontal synchronization sensor).

Figure 7A:
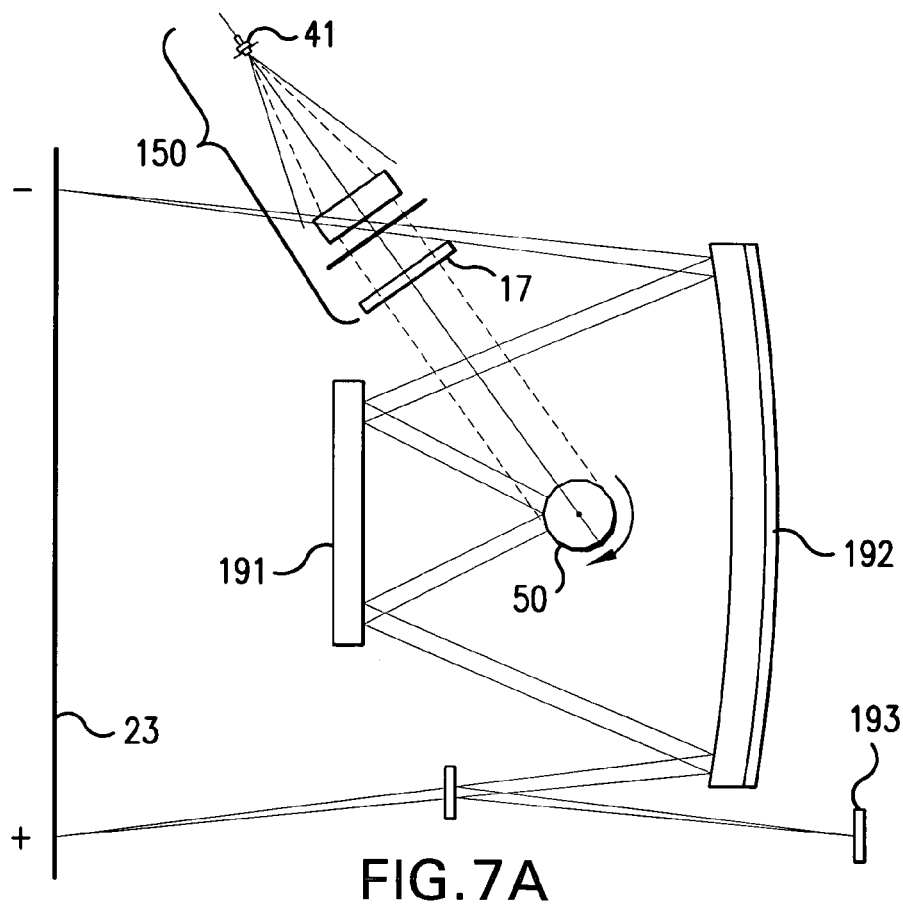
FIGS. 7A and 7B are schematic views showing an example of applying the present invention to a light scanning unit having an image forming system using mirrors which are different from any mirror of the light scanning units shown in FIGS. 2A and 2B, and FIGS. 5A and 5B.
Figure 7B:
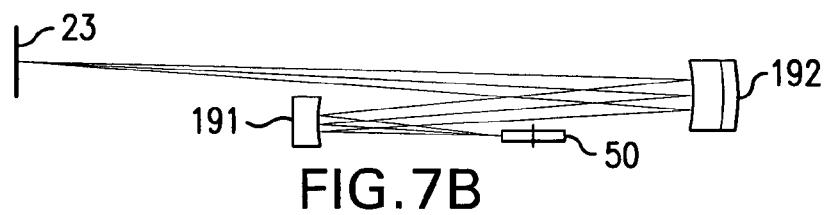

FIGS. 7A and 7B show a light scanning unit comprising an image forming system using mirrors which are different from any mirror of the light scanning units shown in FIGS. 2A and 2B, and FIGS. 5A and 5B. The side of the light source from the polygon mirror 50 is substantially the same as the light source side in the system explained above with reference to FIGS. 5A and 5B, and its detailed description will be omitted.

In FIGS. 7A and 7B, the laser beam reflected on an arbitrary reflective surface is provided with divergence in the sub-scanning direction by a first mirror 191 and converwhere the F number becomes large, i.e. the scanning position which is on the '+' side from the center (an end portion of the side (upstream side) where the beam diameter of the laser beam in the first direction becomes great, of the scanning end in the first direction on the photosensitive drum 23) (the influence from the variation in the beam diameter on the image can be restricted by assigning the region of the scanning position where the beam diameter in the first direction is irregular to the horizontal synchronization sensor).

As the laser beam L whose beam diameter in the first direction is great is made incident on the horizontal synchronization sensor 193, inconvenience of being unable to sense the horizontal synchronization is solved.

In other words, where an angle obtained by projecting both the main light beam of the light incident on each of the reflective surfaces of the polygon mirror 50 and the optical axis of the image forming lens 61 onto the scanning plane is represented by α, the horizontal synchronization sensor 193 is positioned at a position where 'α≠0' is satisfied. The predetermined convergence that is provided to the laser beam L by the second mirror 192 is maintained as it is and made incident on the horizontal synchronization sensor 193. That is, especial characteristics of image formation are not further provided to the laser beam directed from the second mirror 192 to the photosensitive drum 23, and the laser beam is guided to the horizontal synchronization sensor 63.

It is apparent from FIG. 7A that the laser beam is scanned to have a scanning width ranging, for example, from −160 mm to 160 mm, on the photosensitive drum 23 in the main scanning direction, by the second mirror 192.

The shape of the reflective surface of the first mirror 191 is represented by the following formula:

$$x = [(cuyy^2)/\{1/\sqrt{(1-aycuy^2y^2-azcuz^2z^2)}\}] + \sum almy^l z m$$

where cuy represents a free-form surface function, y represents a position of the main scanning direction, ay represents a coefficient, cuz represents a free-form surface function, z represents a position of the sub-scanning direction, az represents a coefficient, and aim represents a coefficient.

The power in the main scanning direction, of the first mirror 191, is negative (shaped in a convex) and the power in the main scanning direction, of the second mirror 192, is positive (shaped in a concave).

Thus, in the light scanning unit composed of two mirrors shown in FIGS. 7A and 7B, too, the irregularity in the beam diameter in the image region can be reduced by arranging the horizontal synchronization sensor 193 at the position where the F number becomes large, i.e. the scanning position which is on the '+' side from the center (upstream side) (the influence from the variation in the beam diameter on the image can be restricted by assigning the region of the scanning position where the beam diameter is irregular to the horizontal synchronization sensor). As the laser beam L whose beam diameter is great is made incident on the horizontal synchronization sensor 193, inconvenience of being unable to sense the horizontal synchronization is solved.

As explained above, the light scanning unit of the over-illumination type employs the image forming lens whose angle is shifted from the optical axis in the direction of the main scanning plane or the sub-scanning cross-section when the laser beam scanned on each of the reflective surfaces of the polygon mirror is made to form an image on the photosensitive drum. Thus, a problem arises that the irregularity in the beam diameter of the laser beam in the main scanning direction made to form an image on the photosensitive drum becomes great. However, the influence of the irregularity in the beam diameter on the image can be restricted by arranging the horizontal synchronization sensor at the scanning end side where the beam diameter increases. As the laser beam whose beam diameter is great is made incident on the horizontal synchronization sensor, inconvenience of being unable to sense the horizontal synchronization is solved.

Therefore, the light beam whose beam diameter variation is set in a predetermined range can be obtained at all the scanning positions of the main scanning direction and, as a result, irregularity of density of the exposed image can be restricted and the image quality can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light scanning unit comprising:
   a first optical system modifying a beam shape of a luminous flux emitted from a light source to a predetermined shape;
   a light deflecting unit having at least one reflective surface, wherein the luminous flux modified by the first optical system is deflected, in a first direction in a predetermined direction and a length of the luminous flux incident on a reflective surface in the first direction is greater than a length of a single reflective surface thereof along the first direction;
   a second optical system making the luminous flux deflected in the first direction by the light deflecting unit form an image on an object to be scanned; and
   a sensor for detection of a write position, setting a timing to modulate an intensity of the luminous flux from the light source with image information, the sensor being positioned at an end of a side on which a beam diameter of the luminous flux in the first direction is great, of a scanning end of the first direction on the object to be scanned.

2. The light scanning unit according to claim 1, wherein the first optical system comprises a lens in which power in the first direction is different from power in a second direction orthogonal to the first direction.

3. The light scanning unit according to claim 2, wherein when an angle obtained by projecting a main light beam of the luminous flux made incident on the light deflecting unit and an optical axis of the second optical system onto a scanning plane is represented by $\alpha$, the light scanning unit satisfies a $\alpha \neq 0$.

4. The light scanning unit according to claim 3, wherein the first optical system comprises a lens in which power in the first direction is different from power in a second direction orthogonal to the first direction.

5. The light scanning unit according to claim 1, wherein the second optical system comprises a first mirror whose power in the first direction is negative and a second mirror whose power in the first direction is positive.

6. The light scanning unit according to claim 1, wherein the second optical system is composed of one optical device.

7. The light scanning unit according to claim 1, wherein the second optical system comprises a plastic lens.

8. A light scanning unit comprising:
   an image-forming unit having a predetermined length in a first direction and a predetermined thickness in a direction orthogonal to the first direction, and forming an image of light made incident in directions orthogonal to the respective first and second directions, at a predetermined position of an object to be scanned, nearly linearly along the first direction;
   a light detector which detects the light whose image is formed nearly linearly along the first direction of the object to be scanned, by the image-forming unit, to set a timing to modulate an intensity of the light with image information, the light detector being positioned at any of one side end and the other side end of the first direction of the image-forming unit where a beam diameter in the first direction of the light becomes great;
   a deflecting unit having at least one reflective surface that is elongated in the first direction, and continuously reflecting the light, along the first direction, toward a predetermined position of the image-forming unit, by varying the angle of the reflective surface, a length of the luminous flux incident on a reflective surface in the first direction being greater than a length of the first direction of the reflective surface; and an optical unit modifying a beam shape of the light to be guided to the deflecting unit to a predetermined shape and guiding the light to the reflective surface of the deflecting unit.

9. The light scanning unit according to claim 8, wherein the first optical system comprises a lens in which power of the first direction is different from power of the second direction.

10. The light scanning unit according to claim 6, wherein the second optical system is composed of one optical device.

11. The light scanning unit according to claim 6, wherein the second optical system comprises a plastic lens.

12. The light scanning unit according to claim 9, wherein when an angle obtained by projecting a main light beam of the luminous flux made incident on the light deflecting unit and an optical axis of the second optical system onto a scanning plane is represented by $\alpha$, the light scanning unit satisfies a $\alpha \neq 0$.

13. The light scanning unit according to claim 12, wherein the image forming unit comprises a first mirror whose power in the first direction is negative and a second mirror whose power in the first direction is positive.

14. The light scanning unit according to claim 13, wherein the light detector is positioned at a predetermined position of a subsequent stage of the image-forming unit and the light guided to the light detector retains optical characteristics which are provided to the light by the image-forming unit.

15. An image forming apparatus comprising:
an image carrier capable of retaining an image corresponding to light distribution, wherein when light is applied to the image carrier in a state of being provided with a predetermined potential, the potential is varied;
an exposing unit; and
a developing unit visualizing the image retained by the image carrier,
the exposing unit comprising:
an image-forming unit having a predetermined length in a first direction and a predetermined thickness in a direction orthogonal to the first direction, and forming an image of light incident in directions orthogonal to the respective first and second directions, at a predetermined position of an object to be scanned, nearly linearly along the first direction;
a light detector detecting the light whose image is formed nearly linearly along the first direction of the object to be scanned, by the image-forming unit, to set a timing to modulate an intensity of the light with image information, the light detector being positioned at any of one side end and the other side end of the first direction of the image-forming unit where a beam diameter of the light becomes great;
a deflecting unit comprising at least one reflective surface that is elongated in the first direction, and continuously reflecting the light, along the first direction, toward a predetermined position of the image-forming unit, by varying the angle of the reflective surface, a length of the luminous flux incident on a reflective surface in the first direction being greater than a length of the first direction of the reflective surface; and
an optical unit modifying a beam shape of the light to be guided to the deflecting unit to a predetermined shape and guiding the light to the reflective surface of the deflecting unit.

16. The image forming apparatus according to claim 15, wherein the first optical system comprises a lens in which power in the first direction is different from power in the second direction.

17. The image forming apparatus according to claim 16, wherein the light detector is positioned at a position where when an angle obtained by projecting a main light beam of the luminous flux made incident on the light deflecting unit and an optical axis of the second optical system onto a scanning plane is represented by $\alpha$, $\alpha \neq 0$ is satisfied.

18. The image forming apparatus according to claim 17, wherein the image-forming unit comprises a first mirror whose power in the first direction is negative and a second mirror whose power in the first direction is positive.

19. The image forming apparatus according to claim 17, wherein the light detector is positioned at a predetermined position between the image-forming unit and the object to be scanned and the light guided to the light detector retains optical characteristics which are provided to the light by the image-forming unit.

20. A light scanning unit comprising:
a predeflecting optical system which modifies a shape of luminous flux emitted from a light source and forms an image of the luminous flux as a linear image elongated in a direction parallel to a main scanning direction;
a light scanning means which allows the luminous flux to scan a scan target; and
an image-forming optical system which forms an image of a light beam scanned by the light scanning means on the scan target,
wherein the length of the luminous flux which enters the light scanning means is greater than a length of a single reflective surface thereof in the main scanning direction,
when an angle obtained by projecting the path of the light entering the light scanning means and the optical axis of the image-forming optical system onto a scanning plane is represented by $\alpha$, the condition $\alpha \neq 0$ is satisfied, and
a sensor for detection of a write position is disposed on a side of a scanning end opposite to a side on which the luminous flux enters the light scanning means.

21. A light scanning unit according to claim 20, wherein the predeflecting optical system includes a lens whose focal length in the main scanning direction is different from that in a sub-scanning direction.

* * * * *